United States Patent
Park

(10) Patent No.: US 12,337,825 B2
(45) Date of Patent: Jun. 24, 2025

(54) DEVICE FOR DISTRIBUTING DRIVING FORCE, SYSTEM INCLUDING THE SAME, AND OPERATION METHOD THEREOF

(71) Applicants: Hyundai Motor Company, Seoul (KR); Kia Corporation, Seoul (KR)

(72) Inventor: Jae Il Park, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 377 days.

(21) Appl. No.: 17/853,733

(22) Filed: Jun. 29, 2022

(65) Prior Publication Data
US 2023/0202461 A1 Jun. 29, 2023

(30) Foreign Application Priority Data
Dec. 29, 2021 (KR) .......................... 10-2021-0191431

(51) Int. Cl.
*B60W 30/045* (2012.01)
*B60W 30/09* (2012.01)

(52) U.S. Cl.
CPC .......... *B60W 30/045* (2013.01); *B60W 30/09* (2013.01); *B60W 2510/205* (2013.01); *B60W 2520/14* (2013.01); *B60W 2540/18* (2013.01); *B60W 2720/14* (2013.01); *B60W 2720/406* (2013.01)

(58) Field of Classification Search
CPC ............... B60W 30/045; B60W 30/09; B60W 2720/406; B60W 2510/205; B60W 2520/14; B60W 2540/18; B60W 2720/14; B60W 30/095; B60W 2554/402; B60W 2554/802; B60W 2554/804; B60W 2720/30; B60W 30/02; B60W 30/085; B60W 40/02; B60W 40/114; B60W 2050/0005; B60W 2510/207;
(Continued)

(56) References Cited

U.S. PATENT DOCUMENTS

2009/0228174 A1* 9/2009 Takagi ................ B60T 8/17558
701/41
2010/0049375 A1* 2/2010 Tanimoto .............. B60W 30/12
701/1
(Continued)

FOREIGN PATENT DOCUMENTS

| JP | 2009036306 A | * | 2/2009 | ............. B60K 23/04 |
| JP | 2017-030472 A | | 2/2017 | |
| KR | 10-1725678 B | | 4/2017 | |

*Primary Examiner* — Behrang Badii
(74) *Attorney, Agent, or Firm* — Morgan, Lewis & Bockius LLP

(57) ABSTRACT

A device for distributing a driving force includes a first sensor for collecting first information related to an obstacle located around a vehicle, a second sensor for collecting second information related to a travel state of the vehicle, a driving control device that distributes a driving force to wheels of the vehicle, and a processor electrically connected to the first sensor, the second sensor, and the driving control device, and the processor determines whether an avoidance travel situation of avoiding collision of the vehicle with the obstacle is detected based on the first information and the second information, and controls a posture of the vehicle by adjusting the distributing of the driving force to the wheels when the avoidance travel situation is detected.

17 Claims, 9 Drawing Sheets

(58) Field of Classification Search
CPC ..... B60W 2520/30; B60W 2554/4026; B60W 2554/4029; Y02T 10/72
See application file for complete search history.

(56) References Cited

U.S. PATENT DOCUMENTS

| | | |
|---|---|---|
| 2014/0229069 A1 | 8/2014 | Akiyama |
| 2015/0239442 A1* | 8/2015 | Yamakado .......... B60T 8/17555 |
| | | 701/70 |
| 2017/0029026 A1 | 2/2017 | Okuda et al. |
| 2019/0100197 A1* | 4/2019 | Saiki ...................... B60Q 9/008 |
| 2019/0184978 A1 | 6/2019 | Park et al. |
| 2019/0375398 A1 | 12/2019 | Yajima |
| 2020/0086856 A1 | 3/2020 | Park et al. |
| 2020/0189599 A1* | 6/2020 | Ota ................. B60W 30/18172 |
| 2021/0046819 A1* | 2/2021 | Yu ............................ B60K 1/02 |
| 2021/0094631 A1* | 4/2021 | Watanabe ................. F15D 1/10 |
| 2022/0169215 A1* | 6/2022 | Muramatsu ........... B60T 8/1766 |

* cited by examiner

DEVICE FOR DISTRIBUTING DRIVING FORCE, SYSTEM INCLUDING THE SAME, AND OPERATION METHOD THEREOF

CROSS-REFERENCE TO RELATED APPLICATION

The present application claims priority to Korean Patent Application No. 10-2021-0191431, filed on Dec. 29, 2021, the entire contents of which is incorporated herein for all purposes by this reference.

BACKGROUND OF THE PRESENT DISCLOSURE

Field of the Present Disclosure

The present disclosure relates to a device configured for distributing a driving force, a system including the same, and an operation method thereof, and more particularly, to a technology for performing avoidance steering by adjusting driving forces for left and right wheels of a vehicle when a risk of collision with a forward obstacle is detected.

Description of Related Art

In general, various posture control systems for maintaining equilibrium of a vehicle body during travel are applied to a vehicle. For example, an active roll stabilizer (ARS) that suppresses vehicle roll when the vehicle turns by changing rigidity of a stabilizer bar, an anti-lock brake system (ABS system) that prevents sliding of a wheel during braking, a traction control system (TCS system) that prevents slipping of a driving wheel during sudden unintended acceleration or sudden acceleration of the vehicle, an electronic stability program (ESP) system that stably maintains a behavior of the vehicle, and the like may be applied as the posture control system.

Furthermore, while driving of the vehicle, a situation of urgently turning due to a sharply curved road or an obstacle such as a forward vehicle may occur. In the instant case, the posture control system may generate a control moment to control a posture of the vehicle body by controlling a braking pressure on the wheel of the vehicle. For example, when a steering wheel is excessively manipulated, the posture control system may generate a control moment that reduces a lateral force of the vehicle.

However, in a situation in which the obstacle suddenly appears, an operation of the posture control system may interfere with sufficient turning of the vehicle, so that a situation in which the vehicle collides with the obstacle may occur.

The information included in this Background of the present disclosure section is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a device configured for distributing a driving force, a system including the same, and an operation method thereof for increasing a moment to control a posture of a vehicle body when a vehicle urgently turns.

Another aspect of the present disclosure provides a device configured for distributing a driving force, a system including the same, and an operation method thereof for controlling generation of a moment by controlling a driving force for left and right wheels in a situation in which a vehicle urgently turns.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, a device configured for distributing a driving force includes a first sensor configured for collecting first information related to an obstacle located around a vehicle, a second sensor configured for collecting second information related to a travel state of the vehicle, a driving control device that distributes a driving force to wheels of the vehicle, and a processor electrically connected to the first sensor, the second sensor, and the driving control device, and the processor is configured to determine whether an avoidance travel situation of avoiding collision of the vehicle with the obstacle is detected based on the first information and the second information, and controls a posture of the vehicle by adjusting the distributing of the driving force to the wheels when the avoidance travel situation is detected.

In an exemplary embodiment of the present disclosure, the processor may adjust the distributing of the driving force to left and right wheels of the vehicle to increase a yaw moment in a turning direction of the vehicle when the avoidance travel situation is detected.

In an exemplary embodiment of the present disclosure, the processor is configured to determine whether a return travel situation after avoiding the collision with the obstacle is detected based on the first information and the second information, and adjust the distributing of the driving force to left and right wheels of the vehicle so that a yaw moment of the vehicle is reduced when the return travel situation is detected.

In an exemplary embodiment of the present disclosure, the processor is configured to determine whether a stabilizing travel situation of traveling of the vehicle so that a behavior of the vehicle is stabilized is detected based on the first information and the second information after the avoidance travel situation or before the return travel situation, and control an occurrence of a yaw moment smaller than a yaw moment in the avoidance travel situation when the stabilizing travel situation is detected.

In an exemplary embodiment of the present disclosure, the processor may limit an over steer prevention function from being executed while adjusting the distributing of the driving force to the wheels in the avoidance travel situation.

In an exemplary embodiment of the present disclosure, the second information may include a steering angle, a steering angle speed, a target yaw rate, and a sensor yaw rate of the vehicle, and the processor is configured to conclude that the avoidance travel situation is detected when a product of the steering angle and the steering angle speed is greater than zero (0) and the target yaw rate is greater than the sensor yaw rate.

In an exemplary embodiment of the present disclosure, the processor is configured to conclude that the return travel situation is detected when a product of the steering angle and the steering angle speed is less than or equal to zero (0), and a sign change of the steering angle is detected while the target yaw rate is less than or equal to the sensor yaw rate.

In an exemplary embodiment of the present disclosure, the processor is configured to conclude that the stabilizing travel situation is detected when a product of the steering angle and the steering angle speed is less than or equal to zero (0), and the target yaw rate is less than or equal to the sensor yaw rate in a state where a risk of collision of the vehicle with the obstacle has disappeared.

In an exemplary embodiment of the present disclosure, the driving control device may include a dual driving system including a first driving device configured for providing a driving force to a first wheel and a second driving device configured for providing a driving force to a second wheel.

In an exemplary embodiment of the present disclosure, the driving control device may include a torque vectoring system including a driving device configured for providing driving to a first wheel and a second wheel and a torque control device configured for adjusting torque to the first wheel and the second wheel.

According to another aspect of the present disclosure, a vehicle system includes a manipulation device including a steering input device, an acceleration input device, and a brake input device, a driving device configured for generating power related to driving, and a driving force distributing system electrically connected to the manipulation device and the driving device, and the driving force distributing system determines whether an avoidance travel situation of avoiding collision with an obstacle is detected, and adjusts the distributing of the driving force to left and right wheels to increase a yaw moment in a turning direction of a vehicle when the avoidance travel situation is detected.

In an exemplary embodiment of the present disclosure, the driving force distributing system may determine whether a return travel situation after avoiding the collision with the obstacle is detected, and adjust the distributing of the driving force to the left and right wheels so that the yaw moment of the vehicle is reduced when the return travel situation is detected.

In an exemplary embodiment of the present disclosure, the driving force distributing system may determine whether a stabilizing travel situation of traveling of the vehicle so that a behavior of the vehicle is stabilized is detected after the avoidance travel situation or before the return travel situation, and control an occurrence of a yaw moment smaller than the yaw moment in the avoidance travel situation when the stabilizing travel situation is detected.

According to another aspect of the present disclosure, a method for operating a device for distributing a driving force includes collecting first information related to an obstacle located around a vehicle and second information related to a travel state of the vehicle, determining whether an avoidance travel situation of avoiding collision of the vehicle with the obstacle is detected based on the first information and the second information, and adjusting the distributing of the driving force to left and right wheels to increase a yaw moment in a turning direction of the vehicle when the avoidance travel situation is detected.

In an exemplary embodiment of the present disclosure, the method may further include determining whether a return travel situation after avoiding the collision with the obstacle is detected based on the first information and the second information, and adjusting the distributing of the driving force to the left and right wheels of the vehicle so that the yaw moment of the vehicle is reduced when the return travel situation is detected.

In an exemplary embodiment of the present disclosure, the method may further include determining whether a stabilizing travel situation of traveling of the vehicle so that a behavior of the vehicle is stabilized is detected based on the first information and the second information after the avoidance travel situation or before the return travel situation, and controlling an occurrence of a yaw moment smaller than a yaw moment in the avoidance travel situation when the stabilizing travel situation is detected.

In an exemplary embodiment of the present disclosure, the method may further include limiting an over steer prevention function from being executed while adjusting the distributing of the driving force to the wheels in the avoidance travel situation.

In an exemplary embodiment of the present disclosure, the second information may include a steering angle, a steering angle speed, a target yaw rate, and a sensor yaw rate of the vehicle, and the method may further include determining that the avoidance travel situation is detected when a product of the steering angle and the steering angle speed is greater than zero (0) and the target yaw rate is greater than the sensor yaw rate.

In an exemplary embodiment of the present disclosure, the method may further include determining that the return travel situation is detected when a product of the steering angle and the steering angle speed is less than or equal to zero (0), and a sign change of the steering angle is detected while the target yaw rate is less than or equal to the sensor yaw rate.

In an exemplary embodiment of the present disclosure, the method may further include determining that the stabilizing travel situation is detected when a product of the steering angle and the steering angle speed is less than or equal to zero (0), and the target yaw rate is less than or equal to the sensor yaw rate in a state where a risk of collision of the vehicle with the obstacle has disappeared.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

BRIEF DESCRIPTION OF THE DRAWINGS

In connection with the description of the drawings, the same or similar reference numerals may be used for the same or similar components.

Figure 1A:
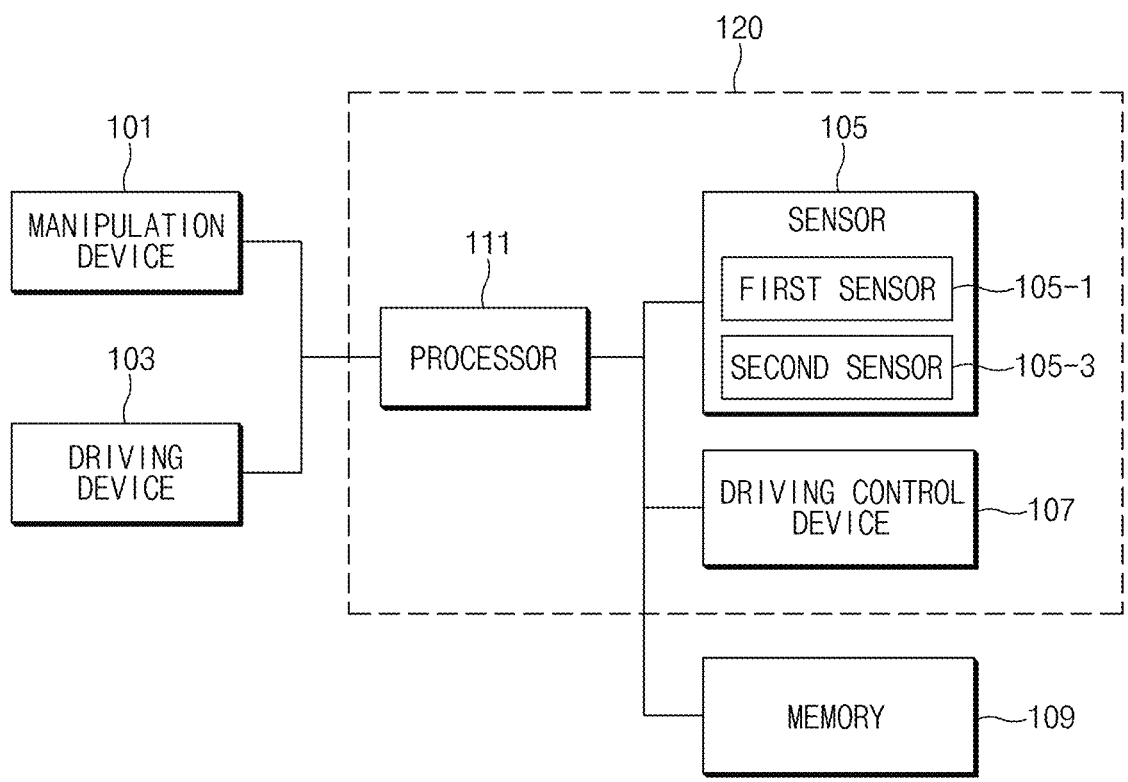
FIG. 1A is a block diagram showing a configuration of a vehicle system including a driving force distributing device according to various embodiments of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, various exemplary embodiments of the present disclosure will be described in detail with reference to the exemplary drawings. In adding the reference numerals to the components of each drawing, it should be noted that the identical or equivalent component is designated by the identical numeral even when they are displayed on other drawings. Furthermore, in describing the exemplary embodiment of the present disclosure, a detailed description of the related known configuration or function will be omitted when it is determined that it interferes with the understanding of the exemplary embodiment of the present disclosure.

In describing the components of the exemplary embodiment according to an exemplary embodiment of the present disclosure, terms such as first, second, A, B, (a), (b), and the like may be used. These terms are merely intended to distinguish the components from other components, and the terms do not limit the nature, order or sequence of the components. Unless otherwise defined, all terms including technical and scientific terms used herein have the same meaning as commonly understood by one of ordinary skill in the art to which the present disclosure belongs. It will be further understood that terms, such as those defined in commonly used dictionaries, should be interpreted as including a meaning which is consistent with their meaning in the context of the relevant art and will not be interpreted in an idealized or overly formal sense unless expressly so defined herein.

A vehicle mentioned in a description below may include a vehicle operated by boarding and manipulation of a driver and an autonomous vehicle having a function of operating by itself without the manipulation of the driver. Furthermore, in the description below, a vehicle will be described as an example of the vehicle, but the present disclosure is not limited thereto. For example, following various embodiments may be applied to various means of transportation such as a ship, an airplane, a train, a motorcycle, a bicycle, or the like.

Hereinafter, with reference to FIGS. 1A to 7, various embodiments of the present disclosure will be described in detail.

Figure 1B:
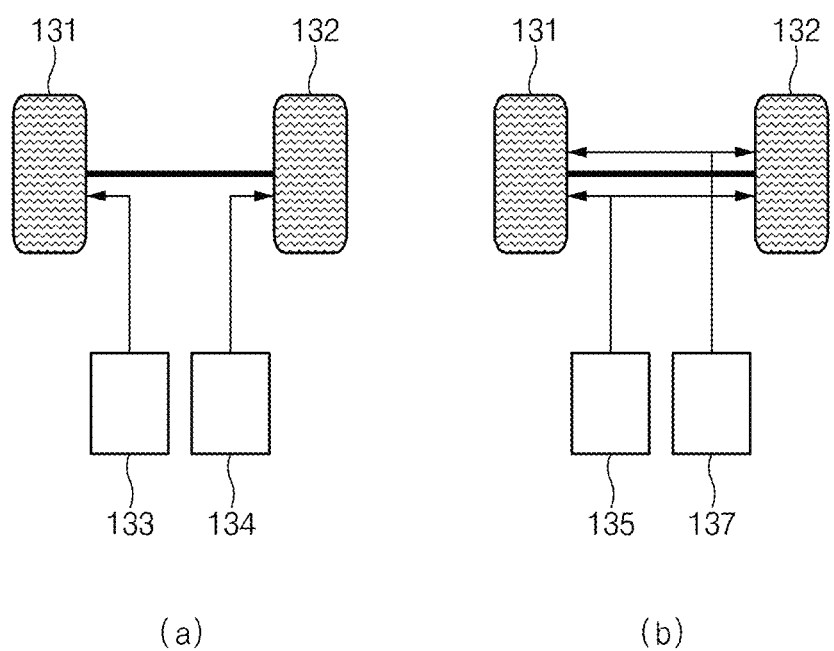
FIG. 1B is a diagram for illustrating a driving control device according to various embodiments of the present disclosure.

FIG. 1A is a block diagram showing a configuration of a vehicle system including a driving force distributing device according to various embodiments of the present disclosure. Furthermore, FIG. 1B is a diagram for illustrating a driving control device according to various embodiments of the present disclosure.

Referring to FIG. 1A, a vehicle system 100 according to various embodiments of the present disclosure may include a manipulation device 101, a driving device 103, a sensor 105, a driving control device 107, a memory 109, and a processor 111.

However, this is only an example, and the present disclosure is not limited thereto. For example, at least one of the above-described components of the vehicle system 100 may be omitted or one or more other components may be added as a component of the vehicle system 100. Furthermore, at least one of the above-described components of the vehicle system 100 may be integrated with other components.

According to various exemplary embodiments of the present disclosure, the manipulation device 101 may receive a user input for driving. According to an exemplary embodiment of the present disclosure, the manipulation device 101 may include a steering input device (e.g., a steering wheel), an acceleration input device (e.g., an accelerator pedal), and a brake input device (e.g., a brake pedal).

However, this is only an example, and the present disclosure is not limited thereto. For example, devices for manipulating a seat heating wire, an internal light, a radio, a navigation, a direction indicator, a tail lamp, a headlamp, a wiper, air conditioner and heater, and the like provided in the vehicle may also be constructed as at least a portion of the manipulation device 101.

According to various exemplary embodiments of the present disclosure, the driving device 103 may generate power related to the driving of the vehicle. According to an exemplary embodiment of the present disclosure, the driving device 103 may include an engine and/or a motor. For example, the power generated by the driving device 103 may be transmitted to an axle via a transmission and a differential gear. Accordingly, a wheel is rotated by the axle, so that the vehicle travels. The transmission, the differential gear, the axle, and the wheel are known through many documents, so that a detailed description thereof will be omitted in the present disclosure.

According to various exemplary embodiments of the present disclosure, the sensor 105 may include a first sensor 105-1 for collecting vehicle external information. The first sensor 105-1 may include at least one of a front radar, a front-side radar, and a camera. However, this is only an example, and various exemplary embodiments of the present disclosure are not limited thereto. For example, various types of sensors (e.g., an ultrasonic sensor, a laser scanner, and/or a corner radar, a Light Detection and Ranging (LiDAR), an acceleration sensor, and the like) which may detect an obstacle located around the vehicle, and obtain information on a distance and/or a relative speed of the corresponding obstacle, and a type of the obstacle (e.g., a vehicle, a pedestrian, a bicycle, a motorcycle, or the like) may be formed as the first sensor 105-1.

Additionally or alternatively, the sensor 105 may include a second sensor 105-3 for collecting vehicle internal information and/or information related to a travel state of the vehicle. The second sensor 105-3 may include at least one sensor configured for detecting the travel state of the vehicle, and at least one of a yaw rate sensor, a torque measurement sensor, and/or a wheel speed sensor or a steering angle sensor may be formed as the second sensor 105-3.

According to various exemplary embodiments of the present disclosure, the driving control device 107 may adjust a driving force on the wheel of the vehicle. For example, the driving control device 107 may control the driving device 103 to distribute the driving force to left and right wheels of the vehicle. However, this is only an example, and various exemplary embodiments of the present disclosure are not limited thereto. For example, the driving control device 107 may distribute the driving force to front and rear wheels of the vehicle.

According to an exemplary embodiment of the present disclosure, as shown in (a) in FIG. 1B, the driving control device 107 may include a dual driving system (e.g., a dual motor system) including a first driving device (e.g., a first driving motor) 133 that provides the driving force to a first wheel (e.g., a left wheel) 131, and a second driving device (e.g., a second driving motor) 134 that provides the driving force to a second wheel (e.g., a right wheel) 132. Furthermore, as shown in (b) in FIG. 1B, the driving control device 107 may include a torque vectoring system including a driving device 135 that provides driving to the first wheel 131 and the second wheel 132, and a torque control device 137 that adjusts torques for the first wheel 131 and the second wheel 132.

According to various exemplary embodiments of the present disclosure, the memory 109 may include data related to one or more other components of the vehicle system 100, and a program, an algorithm, a routine, and/or an instruction related to operation or control of the vehicle system 100.

For example, the memory 109 may include at least one of recording media (storage media) such as a memory of a flash memory type, a hard disk type, a micro type, a card type (e.g., a secure digital card (SD card) or an extreme digital card (XD card)), and the like, and a memory of a random access memory (RAM) type, a static RAM (SRAM) type, a read-only memory (ROM) type, a programmable ROM (PROM) type, an electrically erasable PROM (EEPROM) type, a magnetic RAM (MRAM) type, a magnetic disk type, and an optical disk type.

According to various exemplary embodiments of the present disclosure, the processor 111 may be electrically connected to the manipulation device 101, the driving device 103, the sensor 105, the driving control device 107, and the memory 109, and may control the overall operation of the vehicle system 100. According to an exemplary embodiment of the present disclosure, the processor 111 may be an electronic control unit (ECU), a micro controller unit (MCU), or another sub-controller mounted on the vehicle.

The vehicle system 100 according to various embodiments of the present disclosure may control the vehicle to return to a previous line and travel after avoiding the obstacle when a risk of collision is detected during the travel. In this regard, the vehicle system 100 may include a driving force distributing device 120 for controlling generation of a moment (e.g., a yaw moment) for controlling a posture of a vehicle body by adjusting the distribution of the driving force to the left and right wheels of the vehicle based on a travel situation. Such driving force distributing device 120 may be implemented inside the vehicle. In the present connection, the driving force distributing device 120 may be integrally formed with the internal control units of the vehicle, or may be implemented as a separate device and connected to the control units of the vehicle by separate connection means. For example, the driving force distributing device 120 may include the sensor 105, the driving control device 107, and the processor 111.

The driving force distributing device 120 according to various embodiments will be described through FIGS. 2A to 3 below.

Figure 2A:
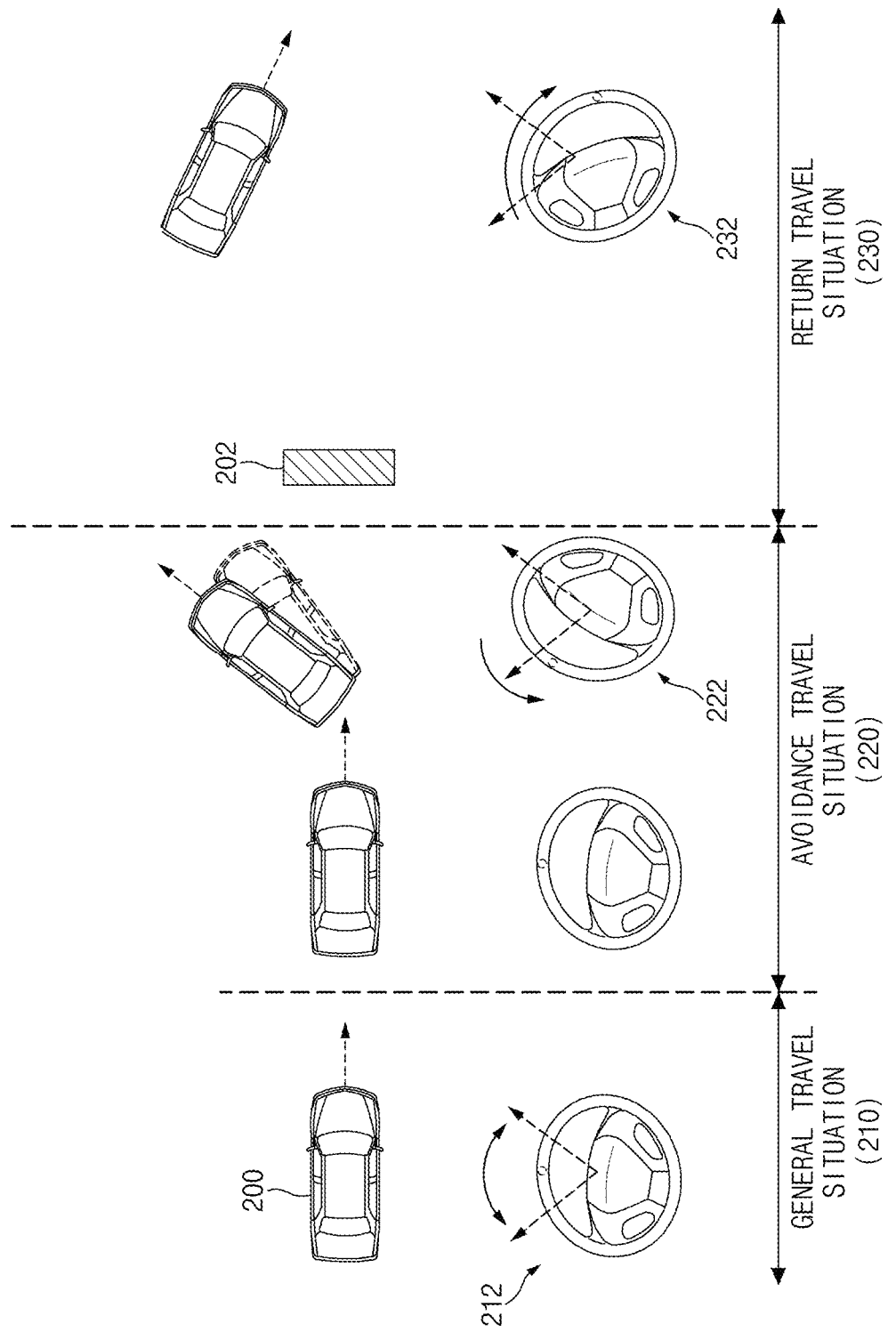
FIG. 2A and FIG. 2B are diagrams for illustrating an operation of a driving force distributing device according to various embodiments of the present disclosure.
Figure 2B:
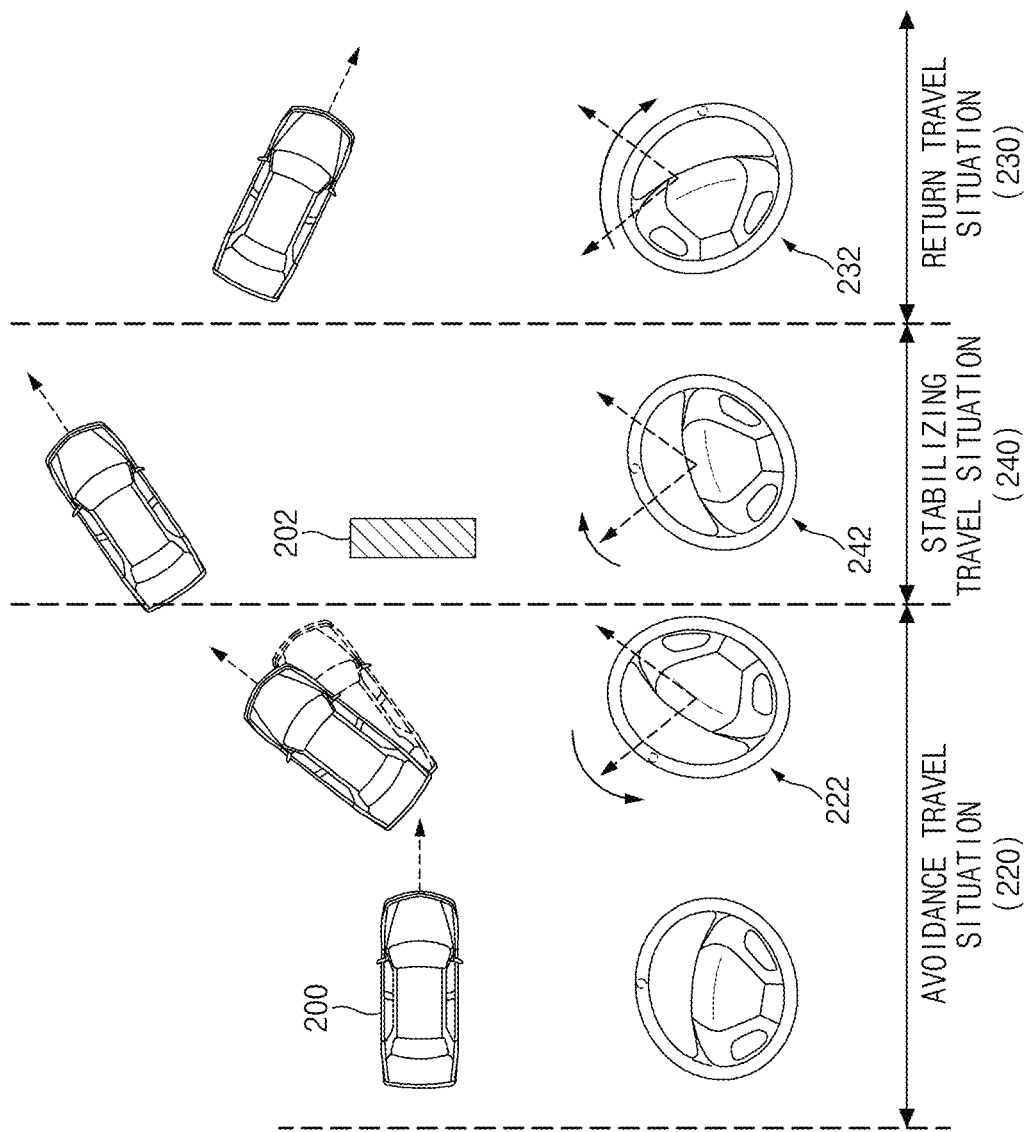
Figure 3:
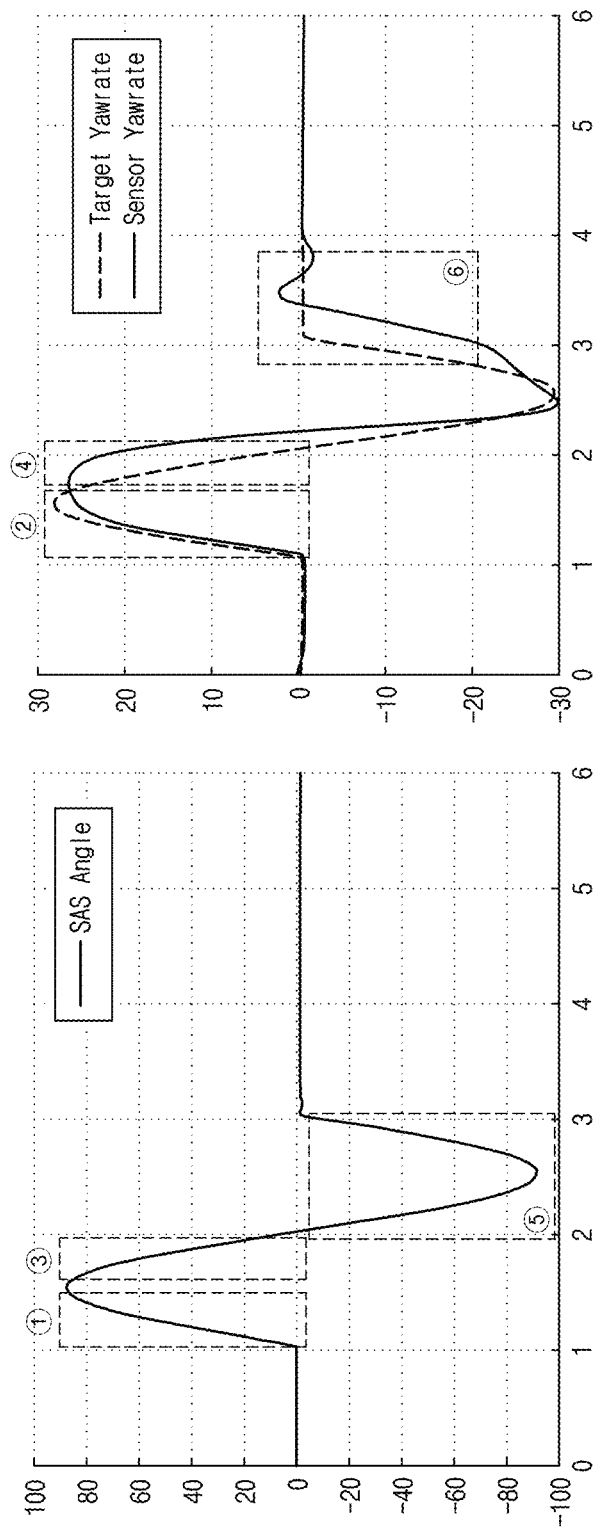
FIG. 3 is a diagram for illustrating a travel situation of a vehicle determined by a driving force distributing device.

FIG. 2A and FIG. 2B are diagrams for illustrating an operation of a driving force distributing device according to various embodiments of the present disclosure. Furthermore, FIG. 3 is a diagram for illustrating a travel situation of a vehicle determined by a driving force distributing device.

Referring to FIG. 2A, a vehicle 200 according to various embodiments of the present disclosure may control the generation of the yaw moment by adjusting distribution of a driving force to left and right wheels of the vehicle 200 based on the travel situation, as described above.

For example, the travel situation of the vehicle 200 may include a general travel situation 210, an avoidance travel situation 220, and a return travel situation 230.

The general travel situation 210, which is a situation in which the vehicle 200 is traveling without a risk of collision with an obstacle 202, may be, for example, a situation 212 in which the steering wheel is manipulated within a predetermined angle (e.g., ±45°) in a first direction (e.g., a clockwise direction) and in a second direction (e.g., in a counterclockwise direction) by the driver.

Furthermore, the avoidance travel situation 220, which is a situation in which the vehicle 200 urgently turns to avoid the collision with the obstacle 202, may be, for example, a situation 222 in which avoidance steering in which the steering wheel is manipulated at an angle exceeding the predetermined angle in the first direction or exceeding the predetermined angle in the second direction by the driver occurs.

Furthermore, the return travel situation 230, which is a situation of returning to a previous line after avoiding the forward obstacle 202, may be, for example, a situation 232 in which the steering wheel is manipulated from the first direction to the second direction or from the second direction to the first direction by the driver (e.g., counter-steering occurs).

According to various exemplary embodiments of the present disclosure, the driving force distributing device 120 (or the processor 111) may determine a travel state of the vehicle 200 based on information collected via the first sensor 105-1 and the second sensor 105-3 while traveling.

According to an exemplary embodiment of the present disclosure, the driving force distributing device 120 (or the processor 111) may detect the obstacle 202 located around (e.g., ahead of, at the rear of, and/or next to) the vehicle 200 based on the information collected via the first sensor 105-1, and determine the risk of collision with the obstacle 202 by determining a time to collision with the detected obstacle 202. Furthermore, when detecting the risk of collision with obstacle 202 (e.g., when the time to collision is less than a reference time), the driving force distributing device 120 (or the processor 111) may determine the travel state of the vehicle 200 based on steering information of the vehicle 200 and information of the yaw rate, which is a lateral acceleration, collected through the second sensor 105-3.

For example, in the state in which the risk of collision with the obstacle 202 is detected, when steering information (such as an angle) (e.g., a product of a steering angle and a change rate of the steering angle) is greater than zero (0) (e.g., ① in FIG. 3), and a target yaw rate is greater than a sensor yaw rate of the vehicle 200 (e.g., ② in FIG. 3), the driving force distributing device 120 (or the processor 111) may determine a current travel situation of the vehicle 200 as the avoidance travel situation 220.

Furthermore, in a state in which the risk of collision with the obstacle 202 has disappeared, when the steering information is equal to or less than zero (0) (e.g., ⑤ in FIG. 3), and when a change in a sign of the steering angle is detected (e.g., when the steering angle changes from + to − or when the steering angle changes from − to +) (e.g., ⑥ in FIG. 3) while the target yaw rate is less than or equal to the sensor yaw rate of the vehicle, the driving force distributing device 120 (or the processor 111) may determine the current travel situation of the vehicle 200 as the return travel situation 230.

According to various exemplary embodiments of the present disclosure, when the travel state of the vehicle 200 is determined, the driving force distributing device 120 (or the driving control device 107) may adjust the distribution of the driving force to the left and right wheels of the vehicle 200 based on the determined travel state.

According to an exemplary embodiment of the present disclosure, the driving force distributing device 120 (or the driving control device 107) may evenly distribute the driving force to the left and right wheels of the vehicle 200 in the general travel situation 210. For example, the driving force in the general travel situation 210 may be determined through a following <Mathematical Equation 1>.

$$T_1 = k_1 \delta + k_2 \cdot \dot{\delta} \quad \text{[Mathematical Equation 1]}$$

In <Mathematical Equation 1> above, $T_1$ means the driving force controlled in the general travel situation, $\delta$ means the steering angle, $\dot{\delta}$ means a steering angle speed, and $k_1$ and $k_2$ mean weights of the driving force applied in the general travel situation.

However, the driving force distributing device 120 (or the driving control device 107) may process the distribution of the driving force to the left and right wheels of the vehicle 200 so that the yaw moment increases in a turning direction of the vehicle 200 in the avoidance travel situation 220.

For example, when the vehicle 200 urgently turns to the left, the driving force distributing device 120 (or the driving control device 107) may distribute more driving force to an external wheel (e.g., the right wheel) than an internal wheel (e.g., the left wheel). Conversely, when the vehicle 200 urgently turns to the right, the driving force distributing device 120 (or the driving control device 107) may distribute more driving force to the external wheel (e.g., the left wheel) than to the internal wheel (e.g., the right wheel).

In the present connection, the driving force distributing device 120 (or the driving control device 107) may restrict an over steer prevention function from being performed. In general, various types of over steer prevention functions may be applied to the vehicle 200, but, in the avoidance travel situation according to various embodiments of the present disclosure, to maximize the increase in the yaw moment in the turning direction of the vehicle 200, the over steer prevention function may be restricted from being performed.

As described above, the distribution of the driving force to increase the yaw moment in the avoidance travel situation 220 may generate a certain level of over steer for the turning vehicle 200. Because of such over steer characteristic, an avoidance distance of the vehicle 200 to the obstacle 202 may be increased, and as a result, an avoidance performance for the obstacle 202 may be improved.

For example, the driving force in the avoidance travel situation 220 may be determined through a following <Mathematical Equation 2>.

$$T_2 = k_3 \cdot \dot{\psi}_{des} k_3 < 0 \quad \text{[Mathematical Equation 2]}$$

In <Mathematical Equation 2> above, $T_2$ means the driving force controlled in the avoidance travel situation, $k_3$ means a weight of the driving force applied in the avoidance travel situation, and $\dot{\psi}_{des}$ means the target yaw rate for the vehicle.

Furthermore, the driving force distributing device 120 (or the driving control device 107) may process the distribution of the driving force to the left and right wheels of the vehicle 200 so that the yaw moment of the vehicle is reduced in the return travel situation 230. For example, the distribution of the driving force to reduce the yaw moment in the return travel situation 230 may reduce a lateral slip angle of the vehicle 200, and consequently, a behavior of the vehicle 200 may be controlled stably.

According to an exemplary embodiment of the present disclosure, the driving force in the return travel situation 230 may be determined through a following <Mathematical Equation 3>.

$$T_4 = k_5 \cdot \dot{\psi}_{des} k_5 > 0 \quad \text{[Mathematical Equation 3]}$$

In <Mathematical Equation 3> above, $T_4$ means the driving force controlled in the return travel situation, $k_5$ means a weight of the driving force applied in the return travel situation, and $\dot{\psi}_{des}$ means the target yaw rate for the vehicle.

As described above, when the avoidance travel situation 220 is changed to the return travel situation 230, the steering angle may change rapidly. As a result, a difference between the driving force distributed to the wheels in the avoidance travel situation 220 and the driving force distributed to the wheels in the return travel situation 230 may increase. Such difference in the driving force may cause abnormal behavior and vibration of the vehicle 200, which may not only reduce ride comfort of the driver, but also reduce travel stability of the vehicle 200 and durability of the vehicle 200.

In this regard, the driving force distributing device 120 (or the driving control device 107) according to various embodiments of the present disclosure may further determine a stabilizing travel situation 240 for the vehicle 200 after the avoidance travel situation 220 or before the return travel situation 230, and limit the increase in the yaw moment in the stabilizing travel situation 240.

The stabilizing travel situation 240, which is a situation of traveling so that the behavior of the vehicle 200 is stabilized after avoiding the collision with the forward obstacle 202 (e.g., a situation of returning to travel straight after the turning), may be a situation 242 in which the steering wheel is manipulated in the first direction and/or in the second direction within a predetermined range in the first direction (e.g., +45°) or within a predetermined range in the second direction (e.g., −45°) by the driver. For example, the stabilizing travel situation 240 may be a situation in which the steering information is equal to or less than zero (0) (e.g., ③ in FIG. 3) and the target yaw rate is equal to or less than the sensor yaw rate of the vehicle 200 (e.g., ④ in FIG. 3).

According to an exemplary embodiment of the present disclosure, in the stabilizing travel situation 240, the driving force distributing device 120 (or the driving control device 107) may distribute the driving force to the wheels so that a yaw moment smaller than the yaw moment in the avoidance travel situation 220 is generated.

According to an exemplary embodiment of the present disclosure, the driving force in the stabilizing travel situation 240 may be determined through a following <Mathematical Equation 4>.

$$T_3 = k_4 \cdot \dot{\psi}_{des} k_4 < 0 \qquad \text{[Mathematical Equation 4]}$$

In <Mathematical Equation 4> above, $T_3$ means the driving force controlled in the stabilizing travel situation, $k_4$ means a weight of the driving force applied in the stabilizing travel situation, and $\dot{\psi}_{des}$ means the target yaw rate for the vehicle.

Figure 4:
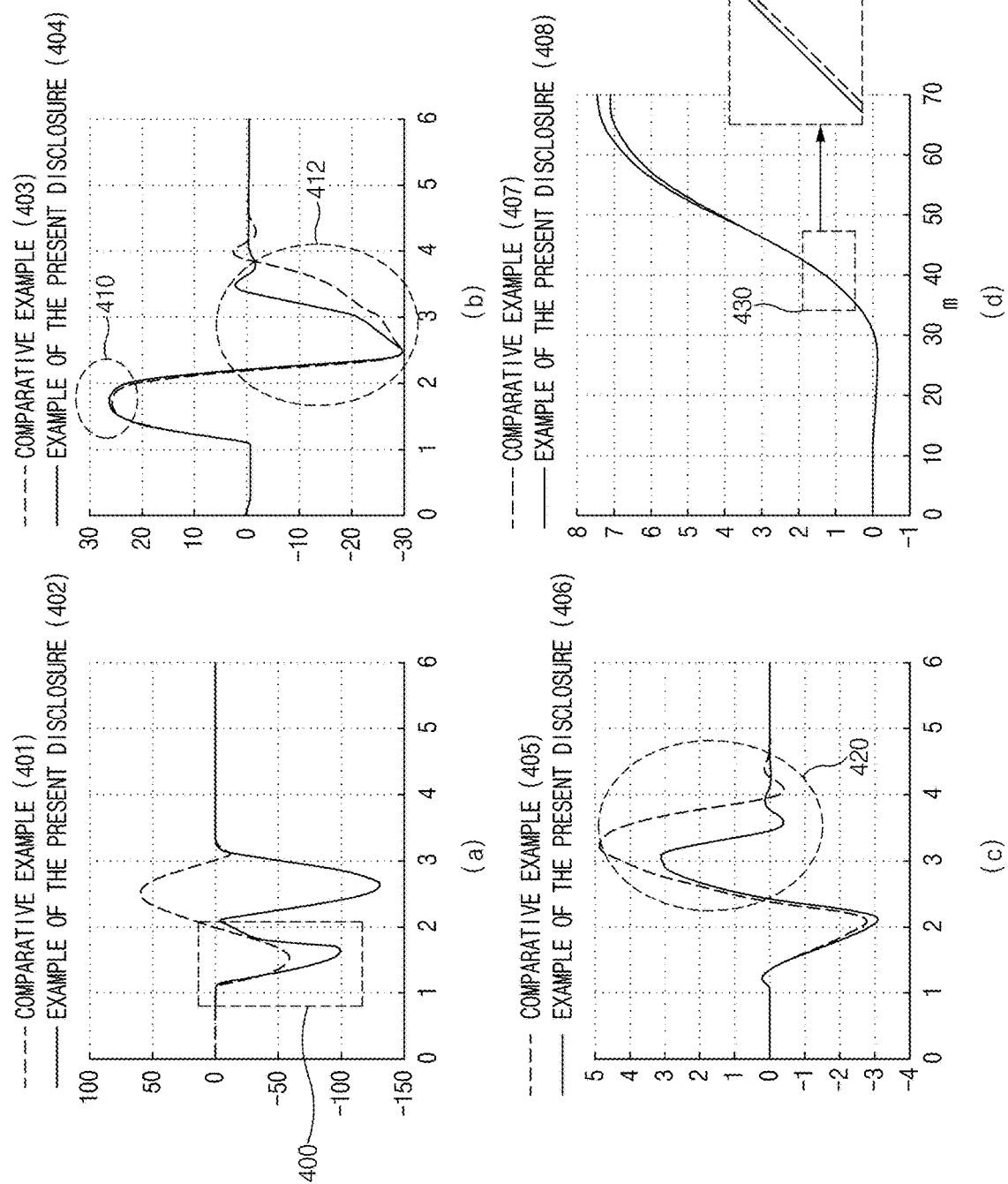
FIG. 4 shows a result of comparing operating performances of a vehicle system according to an exemplary embodiment of the present disclosure and a vehicle system according to Comparative Example.

FIG. 4 shows a result of comparing operating performances of a vehicle system according to an exemplary embodiment of the present disclosure and a vehicle system according to Comparative Example.

(a) in FIG. 4 shows a change in an amount of control of the driving force based on the travel situation of the vehicle system according to an exemplary embodiment of the present disclosure and the vehicle system according to Comparative Example. Referring to (a) in FIG. 4, it may be seen that, in an avoidance travel situation 400, a driving force control amount 402 of the vehicle system according to an exemplary embodiment of the present disclosure is further increased compared to a driving force control amount 401 of the vehicle system according to Comparative Example. It may be seen that, when the vehicle urgently turns, as the yaw moment is increased, the avoidance performance for the obstacle is more improved in the vehicle system according to an exemplary embodiment of the present disclosure than in the vehicle system according Comparative Example.

(b) in FIG. 4 shows a change in the yaw rate of the vehicle system according to an exemplary embodiment of the present disclosure and the vehicle system according to Comparative Example. Referring to (b) in FIG. 4, it may be seen that, in an avoidance travel situation 410, a yaw rate 404 of the vehicle system according to an exemplary embodiment of the present disclosure is further increased compared to a yaw rate 403 of the vehicle system according to Comparative Example. Furthermore, it may be seen that, in a stabilizing travel situation and/or return travel situation 412, the yaw rate 404 of the vehicle system according to an exemplary embodiment of the present disclosure is further reduced compared to the yaw rate 403 of the vehicle system according to Comparative Example. It may be seen that, when the vehicle urgently turns, as the avoidance distance increases, and stable travel of the vehicle is enabled after avoiding the obstacle, the avoidance performance for the obstacle and a travel performance are more improved in the vehicle system according to an exemplary embodiment of the present disclosure than in the vehicle system according to Comparative Example.

(c) in FIG. 4 shows a change in the lateral slip angle of the vehicle system according to an exemplary embodiment of the present disclosure and the vehicle system according to Comparative Example. Furthermore, (d) in FIG. 4 shows a X-Y movement trajectory of the vehicle system according to an exemplary embodiment of the present disclosure and the vehicle system according to Comparative Example.

Referring to (c) and (d) in FIG. 4, it may be seen that, in a stabilizing travel situation and/or return travel situation 420, a lateral slip angle 406 of the vehicle system according to an exemplary embodiment of the present disclosure is reduced compared to a lateral slip angle 405 of the vehicle system according to Comparative Example. Furthermore, it may be seen that, in an avoidance travel situation 430, a lateral distance gain has occurred in an X-axis and Y-axis movement trajectory 408 of the vehicle system according to an exemplary embodiment of the present disclosure compared to an X-axis and Y-axis movement trajectory 407 of the vehicle system according to Comparative Example. Even through such performance comparison, it may be seen that the avoidance performance for the obstacle and the travel performance are more improved in the vehicle system according to an exemplary embodiment of the present disclosure than in the vehicle system according Comparative Example.

Hereinafter, an operation method of a driving force distributing device according to another exemplary embodiment of the present disclosure will be described in detail with reference to FIG. 5 and FIG. 6.

Figure 5:
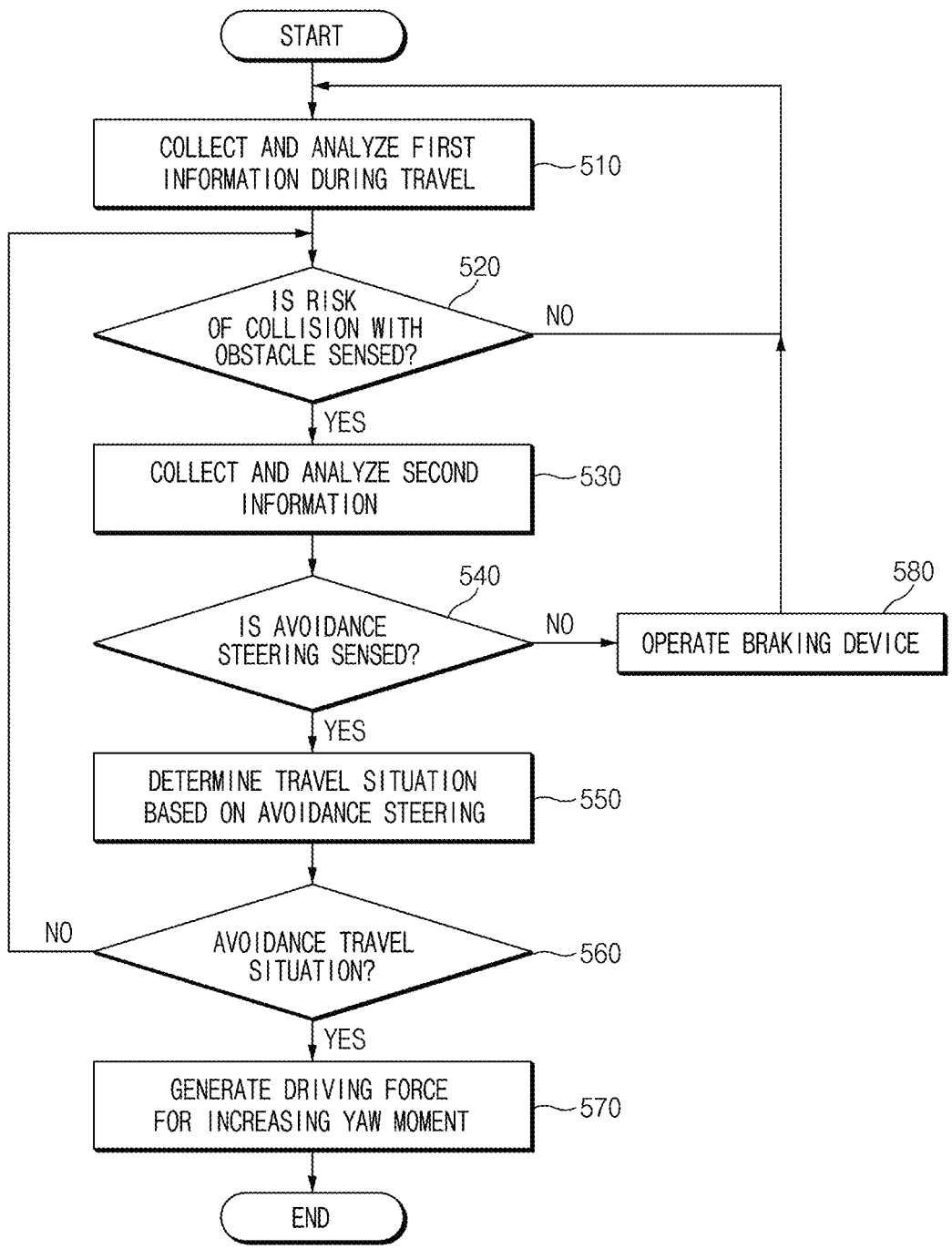
FIG. 5 is a flowchart for illustrating an obstacle avoidance travel operation of a driving force distributing device according to an exemplary embodiment of the present disclosure.

FIG. 5 is a flowchart for illustrating an obstacle avoidance travel operation of a driving force distributing device according to an exemplary embodiment of the present disclosure.

Referring to FIG. 5, in operation 510, the driving force distributing device 120 (or the processor 111) according to various embodiments of the present disclosure may analyze first information collected during the travel. The first information may be used to detect the obstacle 202 located around the vehicle 200, and obtain information on a distance and/or a relative speed of the corresponding obstacle 202, and a type of the obstacle 202 (e.g., the vehicle, the pedestrian, the bicycle, the motorcycle, or the like). According to an exemplary embodiment of the present disclosure, the driving force distributing device 120 may obtain the first information via the first sensor 105-1 such as the ultrasonic sensor, the laser scanner and/or the corner radar, the LiDAR, the acceleration sensor, or the like.

According to various exemplary embodiments of the present disclosure, in operation 520, the driving force distributing device 120 (or the processor 111) may determine whether the risk of collision with the obstacle 202 is detected as a result of the analysis of the first information. According to an exemplary embodiment of the present disclosure, the driving force distributing device 120 may determine the time to collision with the obstacle 202 based on the first information, and may detect the risk of collision with obstacle 202 based on the determined time.

According to various exemplary embodiments of the present disclosure, when the risk of collision with obstacle 202 is not detected, the driving force distributing device 120 (or the processor 111) may control the travel of the vehicle 200. For example, the driving force distributing device 120 may collect the first information during the travel as in operation 510.

According to various exemplary embodiments of the present disclosure, when the risk of collision with the obstacle 202 is detected, in operation 530, the driving force distributing device 120 (or the processor 111) may analyze second information collected during the travel. The second information may be related to internal information of the vehicle 200 or the travel state of vehicle 200. According to an exemplary embodiment of the present disclosure, the driving force distributing device 120 may obtain the second information via the second sensor 105-3 such as the yaw rate sensor, the torque measurement sensor, and/or the wheel speed sensor or the steering angle sensor.

According to various exemplary embodiments of the present disclosure, in operation 540, the driving force distributing device 120 (or the processor 111) may determine whether the avoidance steering for avoiding the collision with the obstacle 202 is detected as a result of the analysis of the second information. According to an exemplary embodiment of the present disclosure, the driving force distributing device 120 may determine whether the avoidance steering is detected using the steering angle of the steering wheel, the yaw rate for the vehicle, and the like.

According to various exemplary embodiments of the present disclosure, when the avoidance steering is not detected, in operation 580, the driving force distributing device 120 (or the processor 111) may operate a braking device. For example, the driving force distributing device 120 may control the braking device before the collision with the obstacle 202 occurs to control the vehicle 200 to stop or to decelerate.

According to various exemplary embodiments of the present disclosure, when the avoidance steering is detected, the driving force distributing device 120 (or the processor 111) may determine the travel situation of the vehicle 200 based on the avoidance steering as in operations 550 and 560. According to an exemplary embodiment of the present disclosure, the driving force distributing device 120 may determine at least one of the avoidance travel situation 220, the stabilizing travel situation 240, and the return travel situation 230 based on the second information.

According to various exemplary embodiments of the present disclosure, when the avoidance travel situation in which the vehicle 200 attempts to avoid the collision with the obstacle 202 via the urgent turning occurs, in operation 570, the driving force distributing device 120 (or the processor 111) may generate the driving force for increasing the yaw moment.

Figure 6:
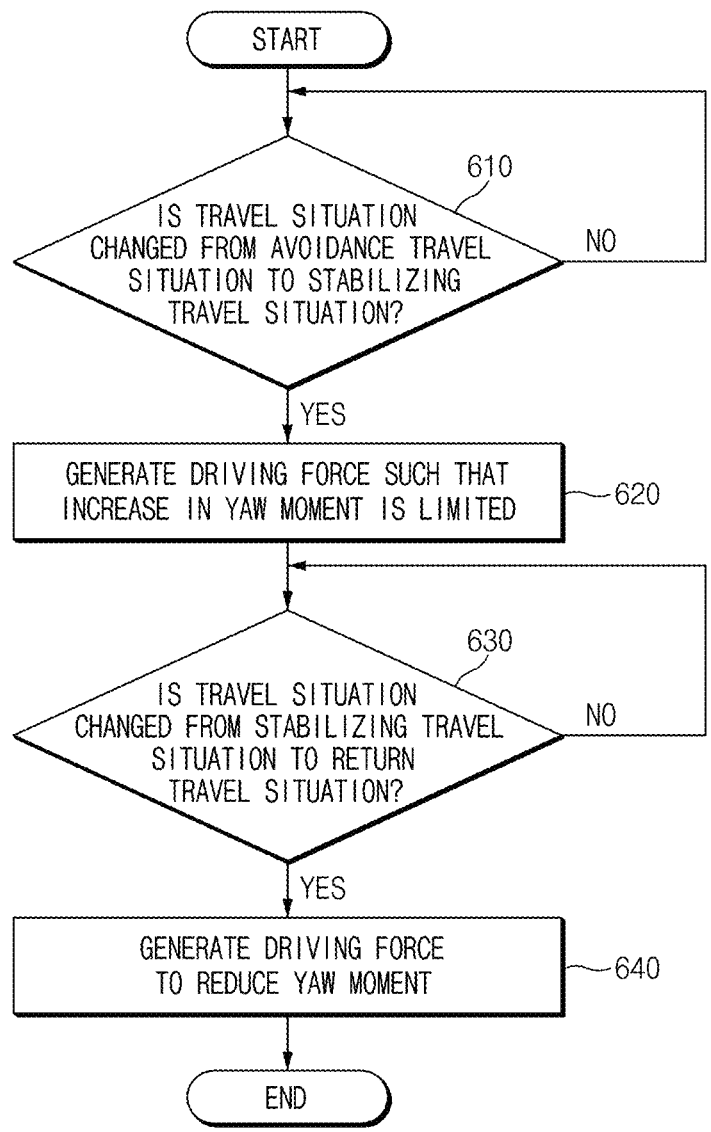
FIG. 6 is a flowchart for illustrating a stabilizing travel operation of a driving force distributing device according to an exemplary embodiment of the present disclosure.

FIG. 6 is a flowchart for illustrating a stabilizing travel operation of a driving force distributing device according to an exemplary embodiment of the present disclosure.

Referring to FIG. 6, in operation 610, the driving force distributing device 120 (or the processor 111) according to various embodiments of the present disclosure may determine whether the travel situation of the vehicle 200 is changed from the avoidance travel situation 220 to the stabilizing travel situation 240.

According to various exemplary embodiments of the present disclosure, when the travel situation of the vehicle 200 is changed to the stabilizing travel situation 240, in operation 620, the driving force distributing device 120 (or the processor 111) may generate the driving force so that the increase in the yaw moment is limited. According to an exemplary embodiment of the present disclosure, the driving force distributing device 120 may distribute the driving force to the wheels such that, during the stabilizing travel situation 240, the yaw moment smaller than the yaw moment in the avoidance travel situation 220 is generated.

According to various exemplary embodiments of the present disclosure, in operation 630, the driving force distributing device 120 (or the processor 111) may determine whether the travel situation of the vehicle 200 is changed from the stabilizing travel situation 240 to the return travel situation 230.

According to various exemplary embodiments of the present disclosure, when the travel situation of the vehicle 200 is changed to the return travel situation 230, in operation 640, the driving force distributing device 120 (or the processor 111) may generate the driving force to reduce the yaw moment. For example, the driving force distributing device 120 may reduce the lateral slip angle of the vehicle 200, so that the behavior of the vehicle 200 may be controlled stably.

Figure 7:
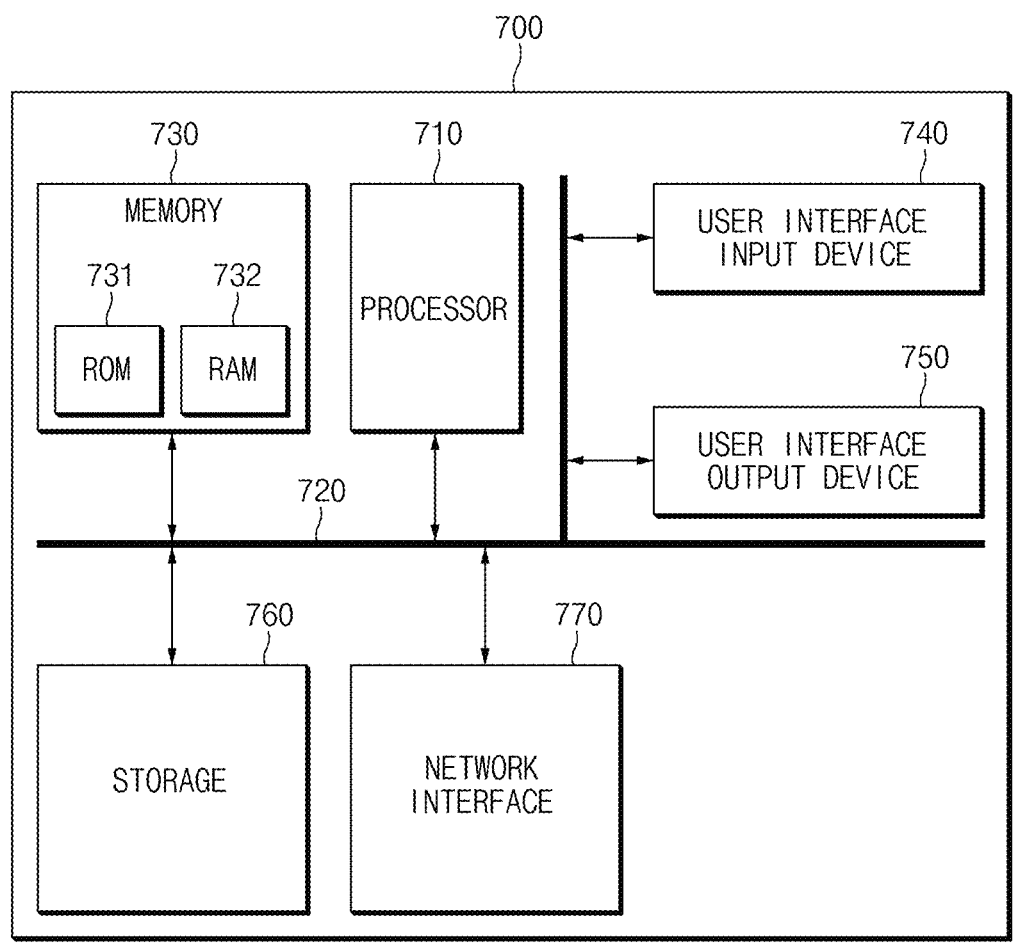
FIG. 7 is a diagram illustrating a configuration of a computing system executing a method according to an exemplary embodiment of the present disclosure.

FIG. 7 is a diagram illustrating a configuration of a computing system executing a method according to an exemplary embodiment of the present disclosure.

Referring to FIG. 7, a computing system 700 may include at least one processor 720, a memory 730, a user interface input device 740, a user interface output device 750, storage 760, and a network interface 770 connected via a bus 710.

The processor 720 may be a central processing unit (CPU) or a semiconductor device that performs processing on commands stored in the memory 730 and/or the storage 760. The memory 730 and the storage 760 may include various types of volatile or non-volatile storage media. For example, the memory 730 may include a Read-Only Memory (ROM) 731 and a Random Access Memory (RAM) 733.

Thus, the operations of the method or the algorithm described in connection with the exemplary embodiments included herein may be embodied directly in hardware or a software module executed by the processor 720, or in a combination thereof. The software module may reside on a storage medium (that is, the memory 730 and/or the storage 760) such as a RAM, a flash memory, a ROM, an EPROM, an EEPROM, a register, a hard disk, a removable disk, and a CD-ROM. The exemplary storage medium is coupled to the processor 720, which may read information from, and write information to, the storage medium. In another method, the storage medium may be integral with the processor 720. The processor 720 and the storage medium may reside within an application specific integrated circuit (ASIC). The ASIC may reside within the user terminal. In another method, the processor 720 and the storage medium may reside as individual components in the user terminal.

The description above is merely illustrative of the technical idea of the present disclosure, and various modifications and changes may be made by those skilled in the art without departing from the essential characteristics of the present disclosure.

Therefore, the exemplary embodiments disclosed in the present disclosure are not intended to limit the technical idea of the present disclosure but to illustrate the present disclosure, and the scope of the technical idea of the present disclosure is not limited by the embodiments. The scope of the present disclosure should be construed as being covered by the scope of the appended claims, and all technical ideas falling within the scope of the claims should be construed as being included in the scope of the present disclosure.

The present technology may increase the avoidance distance of the vehicle to the obstacle by increasing the moment to control the posture of the vehicle body when the vehicle urgently turns.

Furthermore, the present technology may execute the stable return to the straight travel by reducing the moment to control the posture of the vehicle body when the vehicle avoids the obstacle after the urgent turn.

Furthermore, various effects that are directly or indirectly identified through the present specification may be provided.

Furthermore, the terms such as "unit", "module", etc. Included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. An apparatus for distributing a driving force, the apparatus comprising:
   a first sensor configured for collecting first information related to an obstacle located around a vehicle;
   a second sensor configured for collecting second information related to a travel state of the vehicle;
   a driving control device configured for distributing the driving force to wheels of the vehicle; and
   a processor electrically connected to the first sensor, the second sensor, and the driving control device,
   wherein the processor is configured to:
      determine whether an avoidance travel situation of avoiding collision of the vehicle when the obstacle is detected based on the first information and the second information;
      control a posture of the vehicle by adjusting the distributing of the driving force to the wheels when the avoidance travel situation is detected;
      determine whether a return travel situation after avoiding the collision with the obstacle is detected based on the first information and the second information;
      determine whether a stabilizing travel situation of traveling of the vehicle so that a behavior of the vehicle is stabilized is detected based on the first information and the second information after the avoidance travel situation or before the return travel situation; and
      control an occurrence of a yaw moment smaller than a yaw moment in the avoidance travel situation when the stabilizing travel situation is detected.

2. The apparatus of claim 1,
   wherein the wheels includes left and right wheels, and
   wherein the processor is configured to adjust the distributing of the driving force to the left and right wheels of the vehicle to increase a yaw moment in a turning direction of the vehicle when the avoidance travel situation is detected.

3. The apparatus of claim 1,
   wherein the wheels includes left and right wheels, and
   wherein the processor is configured to:
      adjust the distributing of the driving force to the left and right wheels of the vehicle so that a yaw moment of the vehicle is reduced when the return travel situation is detected.

4. The apparatus of claim 1, wherein the processor is configured to limit an over steer prevention function from being executed while adjusting the distributing of the driving force to the wheels in the avoidance travel situation.

5. The apparatus of claim 1,
   wherein the second information includes a steering angle, a steering angle speed, a target yaw rate, and a sensor yaw rate of the vehicle, and
   wherein the processor is configured to conclude that the avoidance travel situation is detected when a product of the steering angle and the steering angle speed is greater than zero (0) and the target yaw rate is greater than the sensor yaw rate.

6. The apparatus of claim 3,
   wherein the second information includes a steering angle, a steering angle speed, a target yaw rate, and a sensor yaw rate of the vehicle, and
   wherein the processor is configured to conclude that the return travel situation is detected when a product of the steering angle and the steering angle speed is less than or equal to zero (0), and a sign change of the steering angle is detected while the target yaw rate is less than or equal to the sensor yaw rate.

7. The apparatus of claim 1,
   wherein the second information includes a steering angle, a steering angle speed, a target yaw rate, and a sensor yaw rate of the vehicle, and
   wherein the processor is configured to conclude that the stabilizing travel situation is detected when a product of the steering angle and the steering angle speed is less than or equal to zero (0), and the target yaw rate is less than or equal to the sensor yaw rate in a state where a risk of the collision of the vehicle with the obstacle has disappeared.

8. The apparatus of claim 1,
   wherein the wheels includes a first wheel and a second wheel, and
   wherein the driving control device includes a dual driving system including a first driving device configured for providing a first driving force to the first wheel and a second driving device configured for providing a second driving force to the second wheel.

9. The apparatus of claim 1,
   wherein the wheels includes a first wheel and a second wheel, and
   wherein the driving control device includes a torque vectoring system including a driving device configured for providing driving to the first wheel and the second wheel and a torque control device configured for adjusting torque to the first wheel and the second wheel.

10. A vehicle system comprising:
    a manipulation device including a steering input device, an acceleration input device, and a brake input device;
    a driving device configured for generating power related to driving of a vehicle; and
    a driving force distributing system electrically connected to the manipulation device and the driving device,
    wherein the driving force distributing system is configured to:
       determine whether an avoidance travel situation of avoiding collision of the vehicle when an obstacle is detected;
       adjust distributing of a driving force to left and right wheels of the vehicle to increase a yaw moment in a turning direction of the vehicle when the avoidance travel situation is detected;
       determine whether a return travel situation after avoiding the collision with the obstacle is detected;
       determine whether a stabilizing travel situation of traveling of the vehicle so that a behavior of the vehicle is stabilized is detected after the avoidance travel situation or before the return travel situation; and
       control an occurrence of a yaw moment smaller than the yaw moment in the avoidance travel situation when the stabilizing travel situation is detected.

11. The vehicle system of claim 10, wherein the driving force distributing system is configured to:
adjust the distributing of the driving force to the left and right wheels so that the yaw moment of the vehicle is reduced when the return travel situation is detected.

12. A method for operating a device for distributing a driving force, the method comprising:
collecting, by a processor, first information related to an obstacle located around a vehicle and second information related to a travel state of the vehicle;
determining, by the processor, whether an avoidance travel situation of avoiding collision of the vehicle when the obstacle is detected based on the first information and the second information;
adjusting, by the processor, the distributing of the driving force to left and right wheels of the vehicle to increase a yaw moment in a turning direction of the vehicle when the avoidance travel situation is detected;
determining, by the processor, whether a return travel situation after avoiding the collision with the obstacle is detected based on the first information and the second information;
determining, by the processor, whether a stabilizing travel situation of traveling of the vehicle so that a behavior of the vehicle is stabilized is detected based on the first information and the second information after the avoidance travel situation or before the return travel situation; and
controlling, by the processor, an occurrence of a yaw moment smaller than the yaw moment in the avoidance travel situation when the stabilizing travel situation is detected.

13. The method of claim 12, further including:
adjusting, by the processor, the distributing of the driving force to the left and right wheels of the vehicle so that the yaw moment of the vehicle is reduced when the return travel situation is detected.

14. The method of claim 12, further including:
limiting, by the processor, an over steer prevention function from being executed while adjusting the distributing of the driving force to the left and right wheels in the avoidance travel situation.

15. The method of claim 12,
wherein the second information includes a steering angle, a steering angle speed, a target yaw rate, and a sensor yaw rate of the vehicle, and
wherein the processor concludes that the avoidance travel situation is detected when a product of the steering angle and the steering angle speed is greater than zero (0) and the target yaw rate is greater than the sensor yaw rate.

16. The method of claim 13,
wherein the second information includes a steering angle, a steering angle speed, a target yaw rate, and a sensor yaw rate of the vehicle, and
wherein the processor concludes that the return travel situation is detected when a product of the steering angle and the steering angle speed is less than or equal to zero (0), and a sign change of the steering angle is detected while the target yaw rate is less than or equal to the sensor yaw rate.

17. The method of claim 12,
wherein the second information includes a steering angle, a steering angle speed, a target yaw rate, and a sensor yaw rate of the vehicle, and
wherein the processor concludes that the stabilizing travel situation is detected when a product of the steering angle and the steering angle speed is less than or equal to zero (0), and the target yaw rate is less than or equal to the sensor yaw rate in a state where a risk of the collision of the vehicle with the obstacle has disappeared.

* * * * *